US 6,585,071 B2

(12) United States Patent
Meurer

(10) Patent No.: US 6,585,071 B2
(45) Date of Patent: Jul. 1, 2003

(54) CASTER STRUCTURE FOR ATTACHMENT TO A REAR END OF A SKID-STEER LOADER

(76) Inventor: Robert Meurer, 1875 Olson Dr., P.O. Box 27, Chippewa Falls, WI (US) 54729

( * ) Notice: Subject to any disclaimer, the term of this patent is extended or adjusted under 35 U.S.C. 154(b) by 41 days.

(21) Appl. No.: 10/201,221

(22) Filed: Jul. 24, 2002

(65) Prior Publication Data

US 2003/0010553 A1 Jan. 16, 2003

Related U.S. Application Data

(62) Division of application No. 09/903,634, filed on Jul. 13, 2001, now Pat. No. 6,439,332.

(51) Int. Cl.[7] ............................ B62D 61/10; B62D 61/12
(52) U.S. Cl. ...................... 180/209; 180/22; 180/24.02; 280/767
(58) Field of Search ................................. 180/6.2, 6.48, 180/22, 24.02, 209, 306, 308, 907; 280/767

(56) References Cited

U.S. PATENT DOCUMENTS

| 3,703,216 A | 11/1972 | Thibodeau |
| 3,752,496 A | 8/1973 | Meinecke, Jr. |
| 3,908,849 A | 9/1975 | Carroll |
| 4,236,587 A | 12/1980 | Shader et al. |
| 4,274,656 A | 6/1981 | Warren |
| 4,392,541 A | 7/1983 | Barchard |
| 4,482,287 A | 11/1984 | Menzi |
| 4,892,155 A | 1/1990 | Wanamaker |
| 5,005,344 A | 4/1991 | McCracken |
| 5,529,131 A | 6/1996 | Van Ornum |
| 5,921,743 A | 7/1999 | Slagter |
| 6,024,381 A | 2/2000 | Mottola |
| 6,182,997 B1 | 2/2001 | Ullrich et al. |
| 6,439,332 B1 * | 8/2002 | Meurer ........................ 180/209 |
| 2002/0139595 A1 * | 10/2002 | Whelan ....................... 180/209 |

* cited by examiner

Primary Examiner—Lesley D. Morris
Assistant Examiner—Matthew Luby

(57) ABSTRACT

A caster assembly is constructed and arranged to be coupled to a rear of skid steer loader. The skid steer loader has a pair of front wheels and a pair of rear wheels and a hydraulic system for driving at least the front wheels. The skid steer loader has an auxiliary hydraulic system. The caster assembly includes at least one caster mounted for rolling and swiveling motion and at least one actuator constructed and arranged to be connected with the auxiliary hydraulic system to cause movement of the caster with respect to the skid steer loader from an inoperative position, wherein the front and rear wheels are in a ground engaging position with the caster in a position so as not to engage the ground, to an operative position, wherein the caster and the front wheels are in a ground engaging position and the rear wheels are in a position so as not to engage the ground.

2 Claims, 3 Drawing Sheets

US 6,585,071 B2

CASTER STRUCTURE FOR ATTACHMENT TO A REAR END OF A SKID-STEER LOADER

This application is a division of application Ser. No. 09/903,634, filed Jul. 13, 2001, now U.S. Pat. No. 6,439,332.

FIELD OF THE INVENTION

This invention relates to all wheel drive skid-steer loaders and, more specifically, to a caster structure attached to a skid-steer loader and employed, in certain situations, as the rear wheels in lieu of the rear wheels of the skid loader.

BACKGROUND OF THE INVENTION

All-wheel drive skid-steer loaders have gained in popularity due to their compact size and maneuverability. The conventional skid-steer loaders are configured so that a variety of attachments may be coupled thereto, such as pallet fork, a box scraper attachment, a dozer blade, etc. One problem in using such loaders is that since they have a small turning radius and may turn very quickly, the driving rear wheels tend to rip-up sod or grass or may damage the surface upon which they are operating. In addition, when carrying an object at the front end of the loader via an attachment, the rear end of the loader may experience an undesirable bouncing motion.

Accordingly, there is a need to provide an attachment for the rear of a skid-steer loader to prevent or minimize damage to the surface upon which the loader is operating and to provide a smoother ride when the loader is carrying an object at the front thereof.

SUMMARY OF THE INVENTION

An object of the invention is to fulfill the need referred to above. In accordance with the principles of the present invention, this objective is obtained by providing a caster assembly constructed and arranged to be coupled to a rear of skid steer loader. The skid steer loader has a pair of front wheels and a pair of rear wheels and a hydraulic system for driving at least the front wheels. The skid steer loader has an auxiliary hydraulic system. The caster assembly includes at least one caster mounted for rolling and swiveling motion and at least one actuator constructed and arranged to be connected with the auxiliary hydraulic system to cause movement of the caster with respect to the skid steer loader from an inoperative position, wherein the front and rear wheels are in a ground engaging position with the caster in a position so as not to engage the ground, to an operative position, wherein the caster and the front wheels are in a ground engaging position and the rear wheels are in a position so as not to engage the ground.

Another object of the invention provides a method of employing an attachment on a skid-steer loader. The loader including a body, a pair of front wheels mounted with respect to a front portion of the body, a pair of rear wheels mounted with respect to a rear portion of the body, and a hydraulic system for driving at least the front wheels. The method provides a caster structure pivotally coupled to the body and including at least one caster mounted for rolling and swiveling motion. An actuator is provided to pivot the caster structure to move the caster from an inoperative position, wherein the front and rear wheels are in a ground engaging position with the caster in a position so as not to engage the ground, to an operative position, wherein the caster and the front wheels are in a ground engaging position and the rear wheels are in a position so as not to engage the ground.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

DETAILED DESCRIPTION OF THE PREFERRED EXEMPLARY EMBODIMENT

Figure 1:
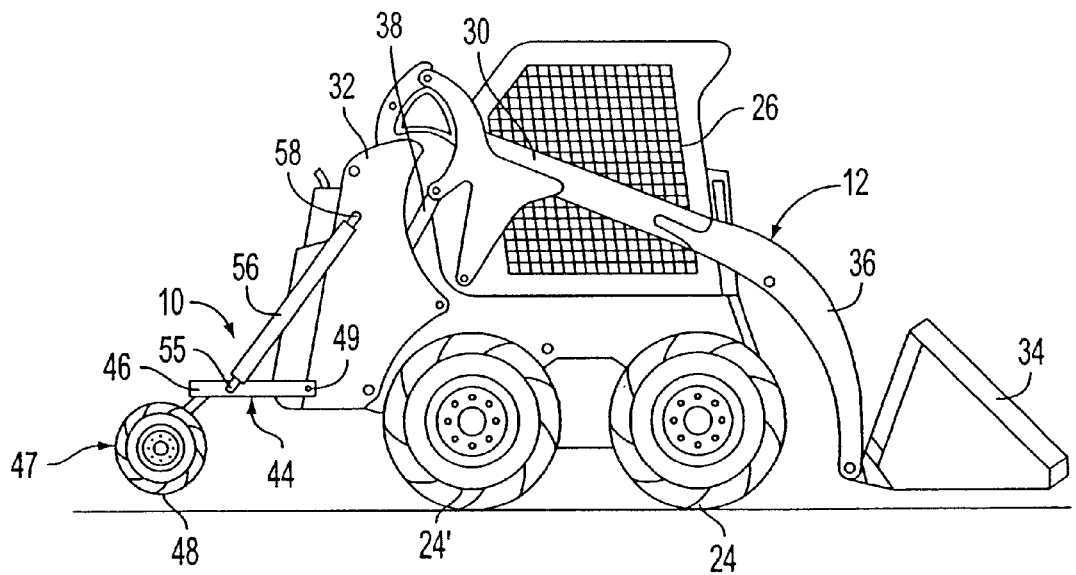
FIG. 1 is a side view of a skid steer loader including a caster structure provided in accordance with the principles of the present invention and shown in an inoperative position.
Figure 3:
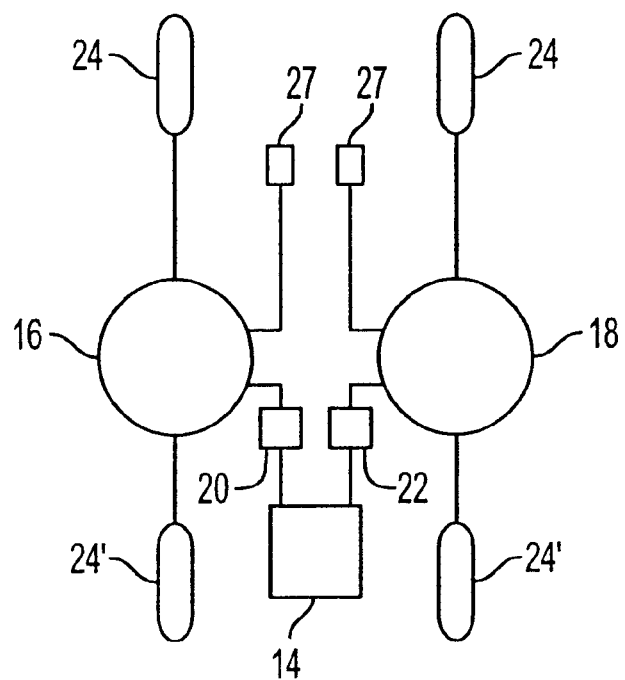
FIG. 3 is a schematic illustration of a hydraulic circuit of the skid steer loader of FIG. 1 for controlling driving and steering of the loader.

With reference to FIG. 1, caster structure, generally indicated at 10 and provided in accordance with the principles of the present invention, is shown coupled to conventional skid-steer loader 12. The skid-steer loader 12 may be of the type manufactured Melroe Company under the name Bobcat®, such as model 773. As shown in FIG. 3, these vehicles typically include a rear mounted engine 14 which drives hydraulic pumps 16 and 18. A first variable displacement hydraulic pump 16 is fluidly coupled to a first hydraulic motor 20 on the left side of the skid steer loader 12, while a second variable displacement hydraulic pump 18 is coupled to a second motor 22 on the right side of the loader 12. Front wheels 24 and rear wheels 24' on the left and right sides of the loader 12 are driven by their respective motors through chain and sprocket linkages (not shown). An operator seated within an operator compartment 26 controls the motion of the loader 12 by actuating a pair of steering levers 27 which are linked to the variable displacement hydraulic pumps. The extent to which each lever 27 is pushed in the forward direction controls the amount of fluid supplied in a first direction to its respective hydraulic motor, and therefore the speed at which the wheels on that side of the vehicle will rotate. Similarly, the extent to which a lever 27 is pulled in the reverse direction will control the speed at which the wheels on that side of the vehicle are rotated in the reverse direction.

Figure 4:
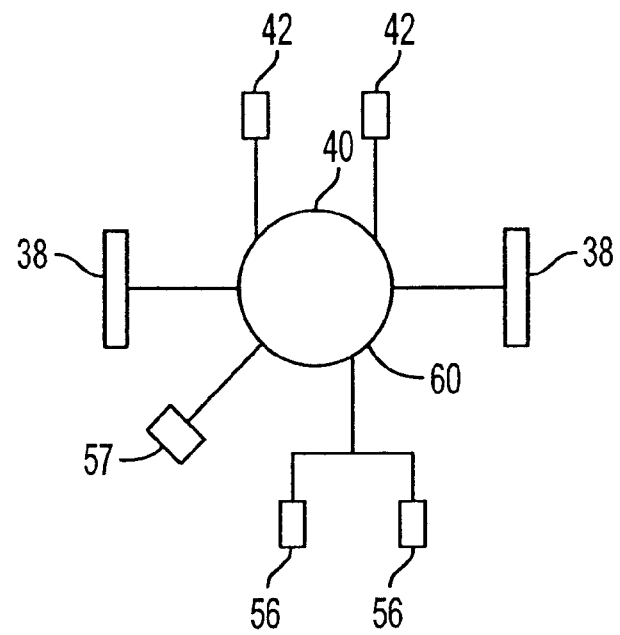
FIG. 4 is a schematic illustration of a hydraulic circuit of the skid steer loader of FIG. 1 for controlling movement of attachments and the caster structure.

The conventional skid steer loader 12 also includes a boom assembly formed by a pair of lift arms 30 mounted to a body 32 of the steer loader 12. A front mounted attachment such as dozer blade 34 is mounted to lift arms 30 by means of mount 36. The lift arms 30 are raised and lowered with respect to the body 32 by a lift cylinder 38 associated with each lift arm 30. As shown in FIG. 4, a separate hydraulic system including a constant displacement pump 40 is used to actuate the lift arms via the cylinders 38. The dozer blade 34 is rotated with respect to lift arms 30 by tilt cylinders 42 (FIG. 4) which are independently actuated through movement of separate foot pedals (not shown) mounted toward the front of operator's compartment as is known in the art.

Figure 5:
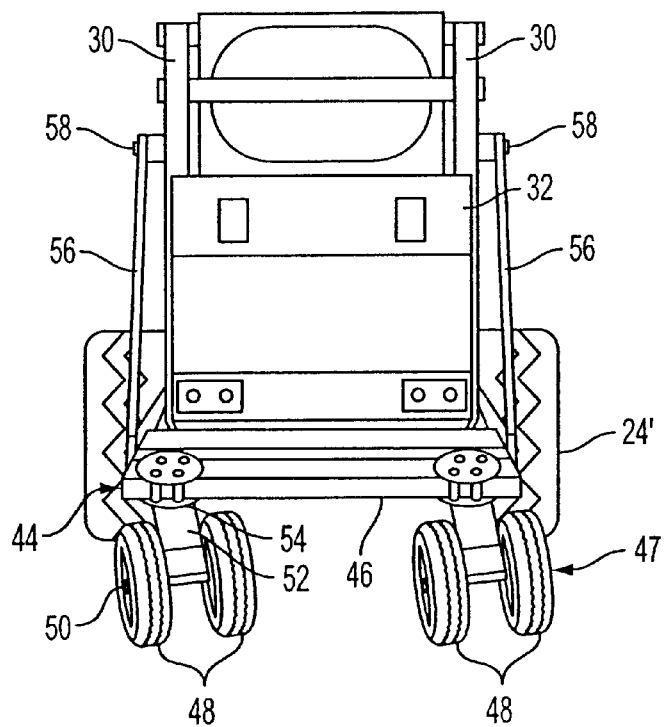
FIG. 5 is a rear view of the skid steer loader and caster structure of FIG. 1.
Figure 6:
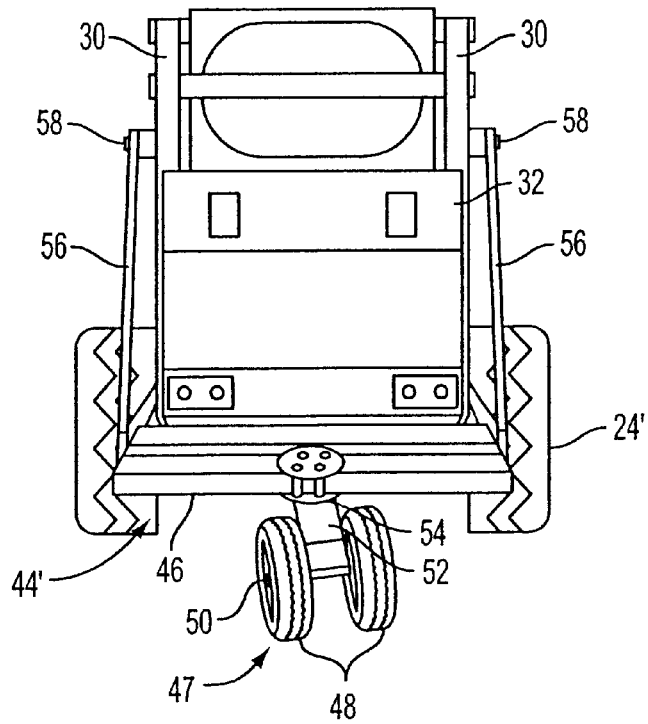
FIG. 6 is a rear view of another embodiment of caster structure attached to a skid steer loader.

In accordance with the invention, a caster structure, generally indicated at 44, includes a frame structure 46 and at least one caster 47 coupled to the frame structure 46. In the embodiment of FIG. 5, a pair of casters 47 are provided and each caster 47 includes a pair of closely spaced apart wheels 48 mounted on a common axle 50. Each caster 47 includes an upwardly extending axle 52 formed with a swivel bearing 54 which is coupled to the frame structure 46. Thus, the wheels 48 can roll due to the axle mount and are permitted to swivel 360 degrees due to the swivel bearing 54. FIG. 6 shows another embodiment of the caster structure 44' having only one caster 47.

The caster structure 44 is coupled to the body 32 of the steer loader via the frame structure 46. Thus, ends of the frame structure 46 are pivotally connected to the body 32 by pin connections 49. At least one actuator is provided to move the caster structure 44 with respect to the body 32. In the illustrated embodiment, a pair of actuators in the form of hydraulic cylinders 56 are pivotally mounted at one end thereof to the frame structure 46 of the caster structure 44 by a pin connection 55. The other end of each cylinder 56 is pivotally coupled via a pin connection 58 to an associated side of the skid steer loader 12. The hydraulic cylinders 56 are operated through the auxiliary hydraulic system 60 (FIG. 4) provided on the conventional skid steer loader 12. Control of the auxiliary hydraulic system 60 to raise and lower the caster structure 44 is performed by moving a lever 57 in the operator's compartment 26. Moving the lever 57 in one direction causes hydraulic fluid to flow to the cylinders 56 to lower the caster structure 44 so that the casters 47 are moved to an operative, ground engaging position. Moving the lever 57 in the opposite direction causes the hydraulic fluid to move in a reverse direction thus lifting the caster structure 44 and thus the casters 47 to an inoperative position above the ground.

Figure 2:
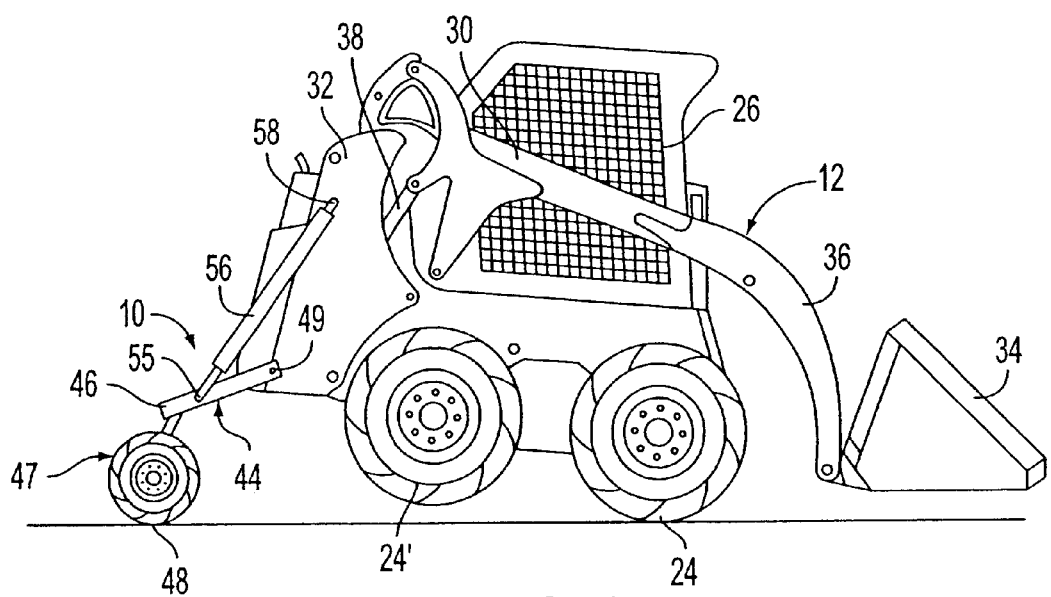
FIG. 2 is a side view of the skid steer loader of FIG. 1 shown with the caster structure in an operative, ground engaging position.

Thus, when the caster structure 44 is not to be employed, the caster 47 are in an inoperative position (FIG. 1) so as to be disposed above the ground. However, when there is a need to minimize damage to the surface upon which the loader 12 is operating and/or to provide a smoother ride when the loader is carrying an object at the front thereof, the caster structure 44 is moved so that the casters 47 are in the operative, ground-engaging position (FIG. 2). Thus, the cylinders 56 are extended, causing the caster structure 44 to move downwardly with the casters 47 engaging the ground. This causes the rear wheels 24' of the skid steer loader to be lifted from ground engagement. Thus, only the front wheels 24 are driving the loader 12, with the casters 47 rolling and swiveling on the ground at the rear of the loader 12, thereby minimizing damage to the ground.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A method of providing an attachment on a skid-steer loader, the loader including a body, a pair of front wheels mounted with respect to a front portion of the body, a pair of rear wheels mounted with respect to a rear portion of the body, a hydraulic system for driving at least the front wheels, the method comprising:

providing a caster structure pivotally coupled to the body and including at least one caster mounted for rolling and swiveling motion, and providing an actuator to pivot the caster structure to move the caster from an inoperative position, wherein the front and rear wheels are in a ground engaging position with the caster in a position so as not to engage the ground, to an operative position, wherein the caster and the front wheels are in a ground engaging position and the rear wheels are in a position so as not to engage the ground.

2. The method of claim 1, wherein the step of providing an actuator includes coupling a hydraulic cylinder between the caster structure and the body to pivot the caster structure with respect to the body.

\* \* \* \* \*